3,304,964
APPARATUS FOR FILLING POWDERED OR GRANULAR MATERIAL INTO CONTAINERS
Boyd W. Rose, Riverside, Calif., assignor to FMC Corporation, a corporation of Delaware
Filed July 13, 1960, Ser. No. 42,687
2 Claims. (Cl. 141—68)

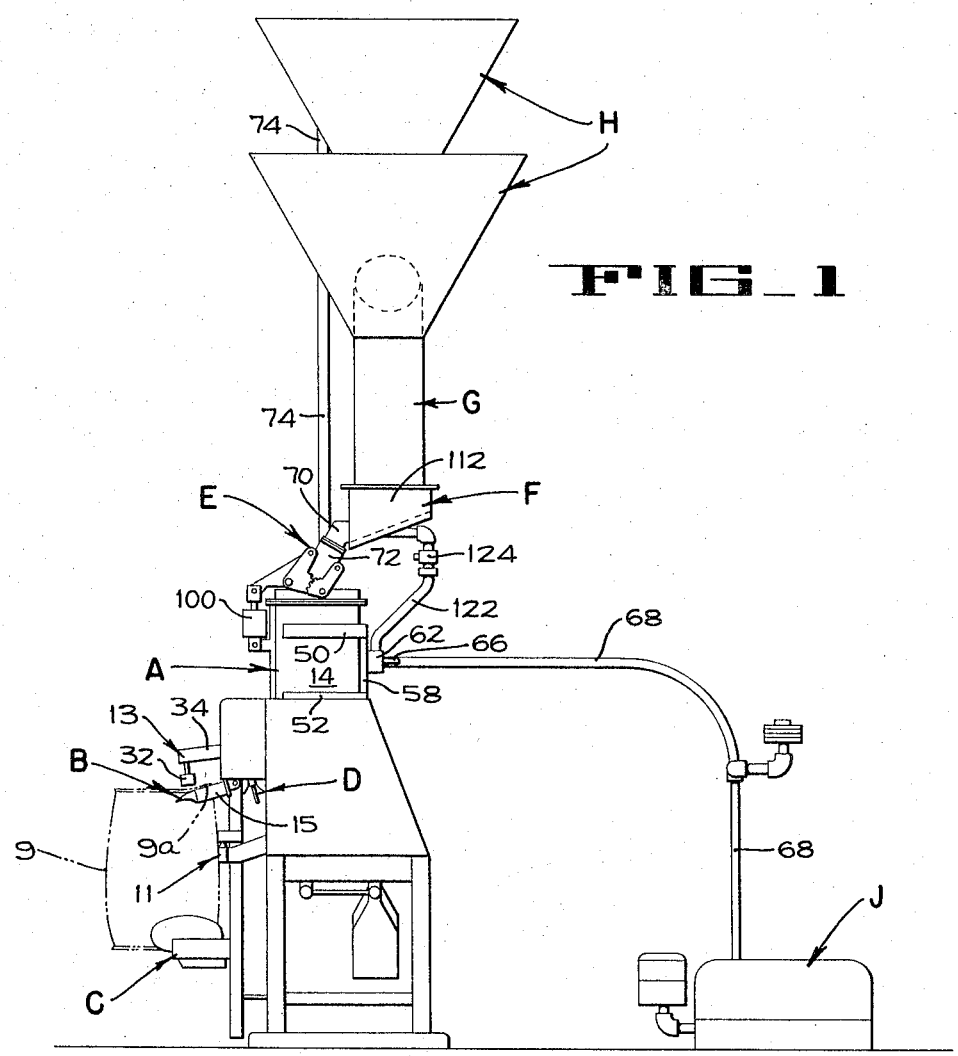

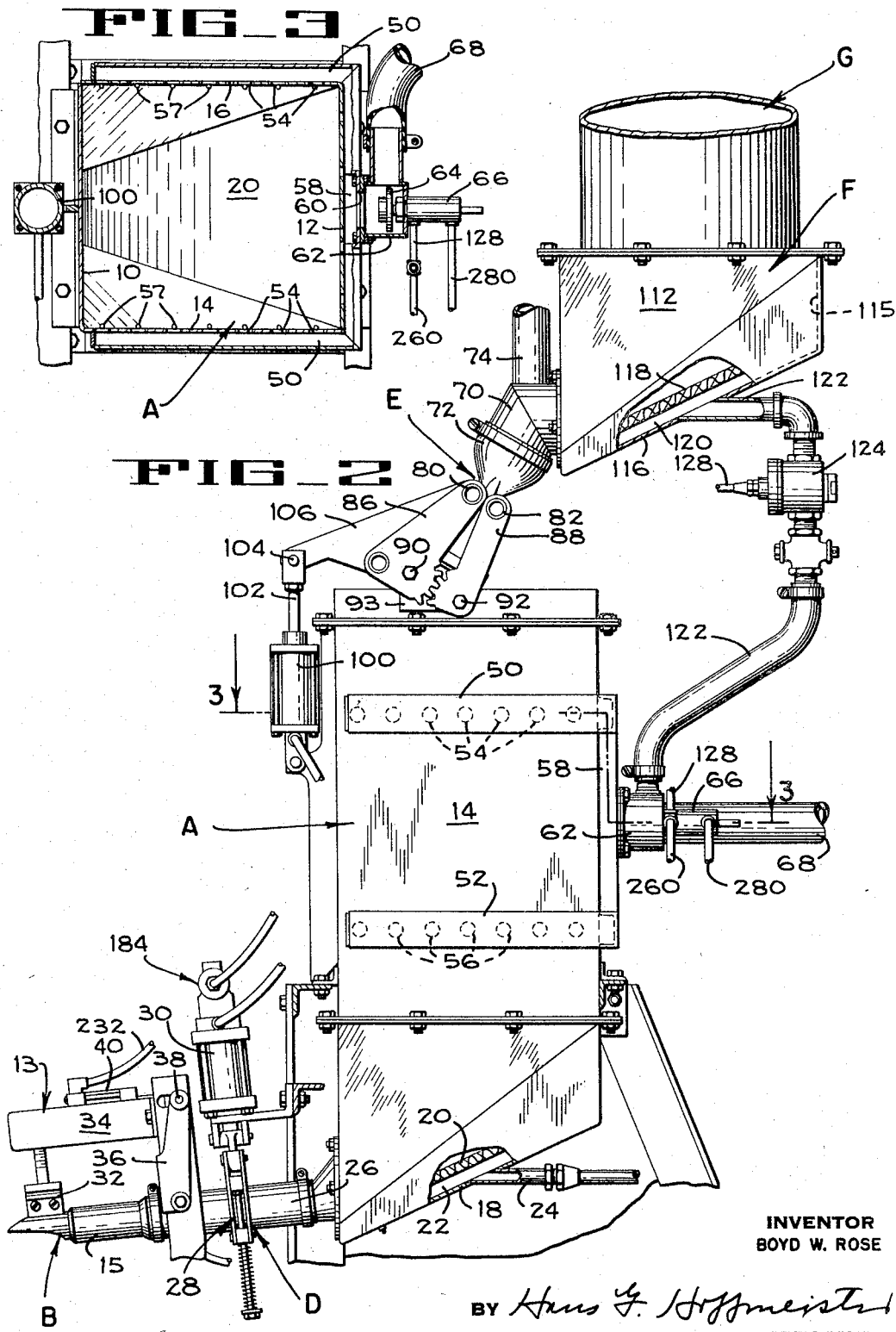

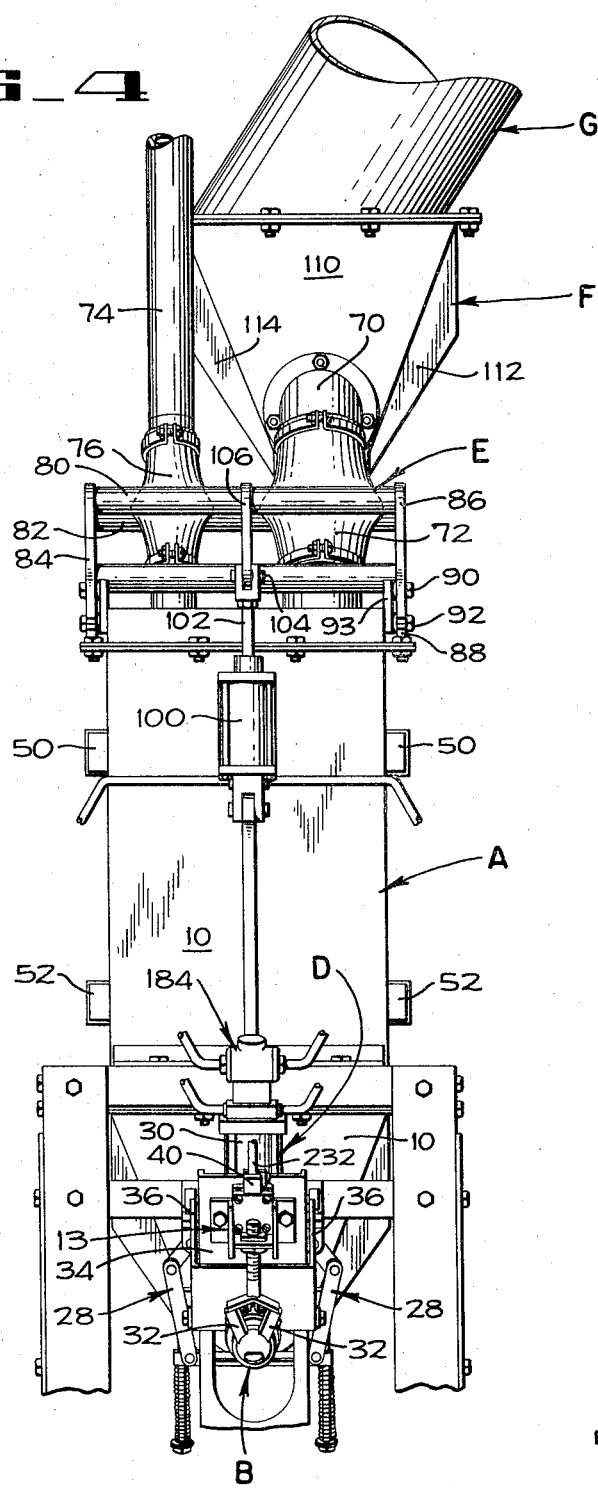

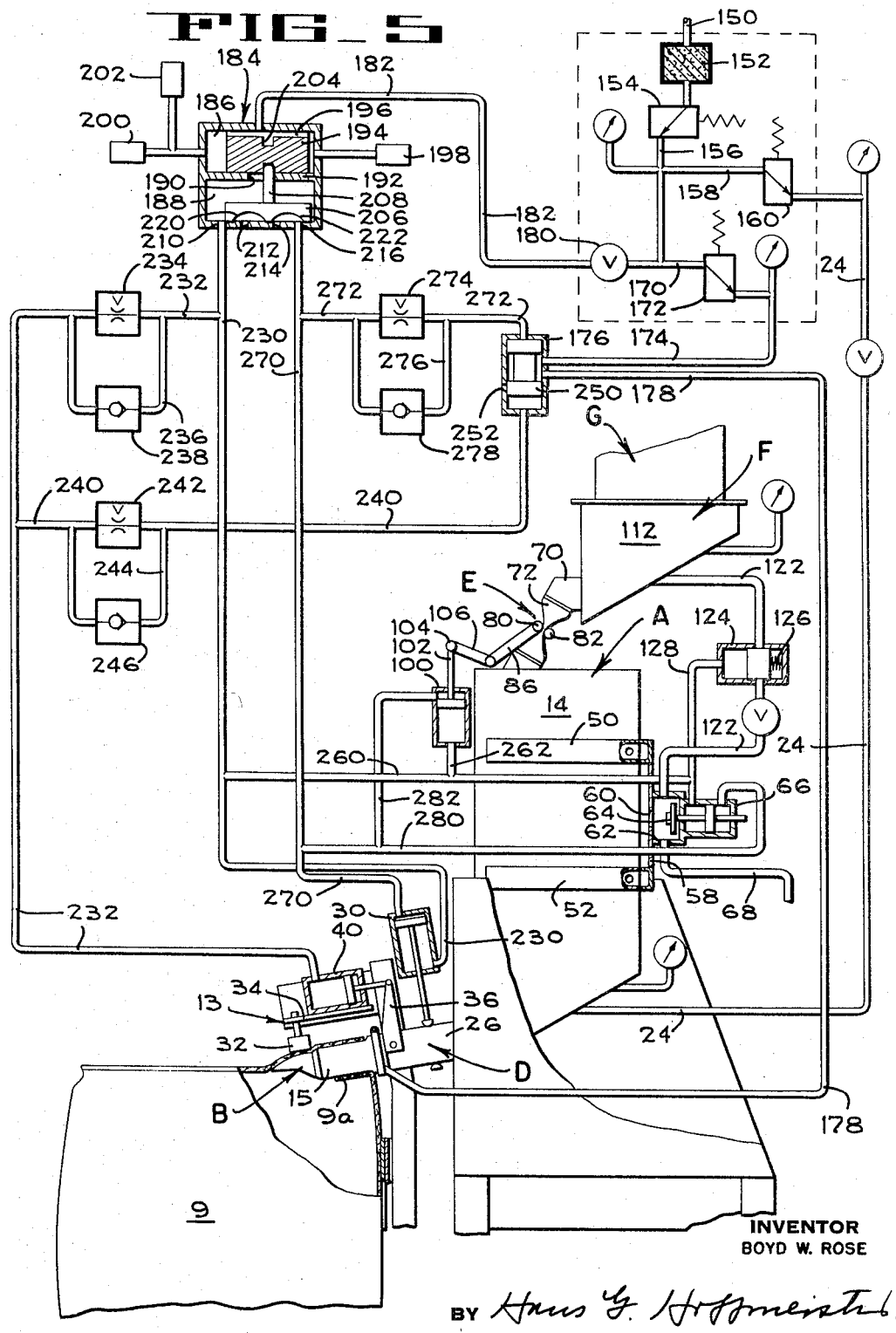

This invention pertains to an apparatus for filling powdered or granular material into suitable containers such as bags of fabric, or paper.

In prior container filling mechanisms of the fluidizing type, the storage and fluidizing chamber for the material had to be of considerable height in order to provide sufficient pressure head to cause the material to flow into the container. The present invention is designed to eliminate the need for a tall storage chamber while retaining the desirable flow characteristics thereof by applying dynamic fluid pressure to the storage chamber during the container filling cycle.

It is, therefore, an object of the invention to provide apparatus for packing fluidized powdered material into bags wherein a constant head is maintained on the fluidized material to insure accuracy of the quantity of material deposited in the bags.

Another object of the invention is to provide apparatus for packing fluidized material into bags, wherein the storage chamber is pressurized so that the rate of flow into the bags is not dependent on gravity alone and, accordingly, the fluidized storage container need not be as tall as it must be in machines of this type which rely only on flow due to the effect of gravity.

These and other objects of the present invention will be apparent from the following description and the accompanying drawings in which:

FIG. 1 is a schematic side elevation of a bag filling installation employing the bag filling apparatus of the present invention.

FIG. 2 is a fragmentary side elevation of the bag filling apparatus of the present invention drawn to a larger scale.

FIG. 3 is a section taken on lines 3—3 of FIG. 2.

FIG. 4 is a front elevation of the bag filling apparatus illustrated in FIG. 2.

FIG. 5 is a schematic illustration of the pneumatic system for controlling the operation of the apparatus illustrated in FIGS. 1-4.

The embodiment of the fluidizing apparatus of the present invention shown in FIG. 1 comprises a fluidizing pressure chamber A having a bag-filling spout B adjacent its lower end. A bag 9 to be filled is placed on a bag support C which is, in turn, mounted on a scale 11. The bag 9 is of the type wherein the material enters the bag through a generally tubular portion 9a that is known as a bag valve. In order to fill the bag 9, the filling spout B, which is in communication with the pressure chamber A, is inserted within the valve 9a of the bag 9 and is clamped in this position against a stationary clamping structure 13. A fluidized material contained in the pressure chamber A is then directed into the bag 9 through the filling spout B. In order to prevent a portion of the fluidized material flowing into the bag from escaping between the valve 9a and the filling spout B, a pneumatic bag seal 15 is provided which, when inflated, seals this opening. As the bag 9 is being filled, the bag and its contents are continuously weighed by the scale 11. When a desired weight of material is reached, the scale automatically activates a control system to close a valve mechanism D (FIG. 2) which stops the flow of material into the bag 9. Immediately thereafter, the bag seal is deflated and the filling spout is swung away from the clamping structure. Due to the fact that the weight of the bag is disposed on the bag support C in an off-center position and to the fact that the upper end of the bag is released from the spout B, the filled bags swings outwardly and falls free of the apparatus. The above-mentioned members of the machine of FIG. 1 are substantially identical to those disclosed in my U.S. Patent No. 2,866,484. Accordingly, reference may be had to this patent for a more detailed description of the filling spout B and its mounting, the scale mechanism 11, the bag clamping mechanism 13, the pneumatic bag seal 15, the valve mechanism D which stops the flow of material into the bag, the bag support C, and any of the other mechanisms not described in detail hereinafter.

After each bag filling operation, material to replenish the pressure chamber A is supplied to the chamber through a pneumatically controlled valve assembly E (FIGS. 1 and 2) from a second fluidizing chamber F which in turn is connected by a conduit G to storage hoppers H (FIG. 1). In accordance with the teaching of the present invention, low pressure air for pressurizing the chamber A, and for fluidizing the chamber F, is supplied by a high volume low pressure blower J.

The pressure chamber A (FIGS. 2, 3 and 4) is composed of a front wall 10, a rear wall 12 and two side walls 14 and 16. The bottom wall 18 of the chamber slopes downwardly and forwardly toward the front wall 10. As seen in FIG. 2, a false bottom 20 of porous material is located within the chamber A spaced upwardly from the bottom wall 18 to form a plenum chamber 22. Air is supplied to the plenum chamber 22 through a conduit 24 in a manner described hereinbelow and filters through the porous membrane 20 to fluidize the material within the chamber A.

The filling spout or nozzle B is connected to the front wall 10 of the chamber A adjacent the lower end thereof by a flexible conduit section 26 (FIG. 2). The flow control valve assembly D comprises a mechanism 28 adapted to pinch the flexible conduit 26 and prevent flow therethrough. The mechanism 28 is controlled by a double acting air cylinder 30 in a manner described hereinbelow. The nozzle B is mounted for limited upward pivotal movement from the position illustrated in FIG. 1 to the position illustrated in FIG. 2 in order to clamp the bags between the nozzle B and the stationary clamping structure 13 which comprises an abutment member 32 mounted on a bracket 34 rigidly secured to the frame of the machine. Two actuating arms, one of which is illustrated at 36 (FIG. 2) are rigidly connected with the nozzle B at one of their ends. The opposite ends of the arms 36 are pivotally connected at 38 to the plunger of an air operated cylinder 40. Thus when a bag is slipper over the nozzle B and air is applied to the cylinder 40 the nozzle will be rotated upwardly to clamp the bag between the nozzle B and the stationary clamp 32.

Two U-shaped air manifolds 50 and 52 (FIGS. 2 and 3) are fixed to the outer surfaces of the side walls and rear wall of the chamber A, one above the other. A series of openings 54 provide communication between the manifold 50 and the interior of the chamber A and, similarly, a series of openings 56 provide communication between the manifold 52 and the interior of the chamber A. Filter cloths (not shown) are held against the inner surfaces of side walls 14 and 16 by a plurality of vertical rods 57 (FIG. 3) and prevent material in the chamber A from passing through the openings 54 and 56 into the manifolds 50 and 52, respectively. A vertical manifold 58, adjacent the mid-portion of the rear wall 12 of the chamber A interconnects the two manifolds 50 and 52. The exterior wall of the manifold 58 is provided with a valve opening 60 (FIG. 3) adjacent its mid-portion and a valve housing 62 is fixed to said rear wall of the manifold 58 surrounding the opening 60.

A disc-shaped plate valve 64 is mounted within the housing 62 and is adapted to be moved into position covering the opening 60, or to a position spaced from the opening 60 to permit air to pass therethrough. The movement of the plate valve 64 is controlled by a double acting air cylinder 66. A conduit 68 connects the valve housing 62 with the discharge side of the blower J.

A conduit 70 (FIGS. 2 and 4) provided with a flexible section 72 connects the upper end of the pressure chamber A with the lower end of the second fluidizing chamber F. Similarly, a vent conduit 74 (FIG. 4), provided with a flexible section 76, connects the upper end of the chamber A with the storage hoppers H to permit venting of the fluidizing air from the chamber A.

The pinch valve mechanism E (FIGS. 2 and 4) comprises two bars 80 and 82. The bar 80 is connected between the outer ends of two arms 84 and 86. Similarly, the bar 82 is connected between the outer ends of two identical arms, one of which is illustrated at 88 in FIG. 2. The arms 86 and 88 are mounted for pivotal movement about the axes of capscrews 90 and 92, respectively, which are threaded into a bracket 93 (FIG. 4) fixed to the side wall 14 of the chamber A. Intermeshing gear teeth are provided on the arms 86 and 88 so that, when the arm 86 is rotated clockwise, the arm 88 will be rotated counterclockwise. The arm 84, and the arm not shown but corresponding to the arm 88, are similarly mounted for rotation and interconnected for conjoint movement. An air cylinder 100 is mounted on the outer surface of the front wall 10 of the chamber A, and the plunger 102 thereof is pivotally connected at 104 to an arm 106 connected to the bar 80 so that when the air cylinder 100 is actuated, the bar 80 is rotated clockwise about the axis of the bolt 90 and the bar 82 is rotated counterclockwise about the axis of bolt 92, so that the two bars cooperate to pinch the flexible section 76 of the vent conduit 74 and the flexible section 72 of the conduit 70 to close the same.

The fluidizing chamber F has a front wall 110 which is provided at its lower end with an opening to which the conduit 70 is connected, two side walls 112 and 114 which converge downwardly toward said opening, and a rear wall 115 (FIG. 2). The bottom 116 of the chamber F (FIG. 2) slopes downwardly and forwardly toward the opening to which conduit 70 is connected. The chamber is provided with a false bottom 118 which is made of porous material and is spaced upwardly from the bottom 116 to provide a plenum chamber 120. A conduit 122 connects the plenum chamber 120 with the valve housing 62. A suitable valve 124 is included within the conduit 122. The valve 124 is normally held in its open position by a spring 126 and is adapted to be closed against the action of the spring 126 by the application of air pressure through a conduit 128, in a manner more fully described hereinbelow.

Referring now to the schematic diagram of the pneumatic control system illustrated in FIG. 5, the low pressure air from the blower J (FIG. 1) enters the control system through the conduit 68 in the lower right hand corner of the schematic diagram. High pressure air from any suitable source of air pressure enters the system through the conduit 150 at the upper right hand corner of the diagram.

Air from the conduit 150 passes through a filter 152 and a pressure regulating valve 154 which regulates the pressure to approximately 80 p.s.i. in the outlet conduit 156 of the pressure regulating valve 154. A branch conduit 158, connected to the conduit 156, conducts air to an additional pressure reducing valve 160 the outlet of which is connected to the conduit 24 which furnishes air to the plenum chamber 22 of the fluidizing and pressure chamber A. The air issuing from the pressure regulating valve 160 into the conduit 24 is regulated to approximately 6 p.s.i.

A second branch conduit 170 connects the conduit 156 to a pressure reducing valve 172 which reduces the air pressure to approximately 6 p.s.i. The outlet of the pressure reducing valve 172 is connected by a conduit 174 to the inlet of a pneumatically operated control valve 176. The outlet of the control valve 176 is connected by a conduit 178 to the inflatable gland or bag seal 15 formed on the outer portion of the nozzle B whereby, when the control valve 176 is actuated, air pressure from the conduit 174 is permitted to travel through the conduit 178 to inflate the gland 15.

The high pressure air from the conduit 156 passes through a manually operated valve 180 and a conduit 182 to a main control valve 184. The valve 184 as schematically illustrated comprises an upper chamber 186 and a lower chamber 188 in communication with each other by means of a slot 190 formed in the wall 192 separating the two chambers. A spool or slide 194 is mounted for sliding movement within the upper chamber 186 of the valve 184. The spool 194 is provided with a longitudinal groove 196 which permits air from the conduit 182 to be conducted to both ends of the slide 194. A manually actuated bleed valve 198 is connected to the chamber 186 adjacent one end of the spool 194. A similar manually operated bleed valve 200 is connected to the chamber 186 adjacent the other end of the spool or slide 194. A scale actuated bleed valve 202 is connected in parallel with the valve 200. With this arrangement, when the valve 198 is actuated the pressure adjacent the right end of the spool 194 as viewed in FIG. 5 is reduced and the pressure existing at the other end of the spool causes the spool to move to the right. Similarly, if either the manual valve 200 or the scale actuated valve 202 is actuated, air is bled from the left end of the chamber 186 and reduces the pressure at the left end of the spool or slide 194, allowing the pressure existant at the other end thereof to move the spool or slide to the left as viewed in FIG. 5.

Annular groove 204 is formed in the spool or slide 194 adjacent the central portion thereof. This annular groove permits air from the conduit 182 to pass through the slot 190 into the lower chamber 188. A slide 206 is mounted in the lower chamber 188 and is provided with a stem 208 which projects upwardly through the slot 190 to the annular groove 204 on the upper slide 194. Four ports 210, 212, 214 and 216 are formed in the outer wall of the lower chamber 188. The slide 206 has formed on its under side two hemispherical recesses 220 and 222, respectively. When the slide is in position to the right as viewed in FIG. 5 it will be noted that the hemispherical recess 222 covers the two ports 214 and 216 placing these ports in communication with each other, and that the port 210 is open to the interior of the chamber 188. Similarly, when the slide is in its left position, the hemispherical recess 220 will provide communication between the ports 210 and 212 and the port 216 will be exposed to the pressure in the interior of the chamber 188.

The master control valve 184 is illustrated in the position it assumes during the filling cycle of the machine. The various assemblies controlled thereby are similarly illustrated in the positions which they would occupy during the filling cycle of the machine. The port 210, which in this position of the valve 184 is exposed to the high pressure air entering from the conduit 182, is connected by a conduit 230 with the lower end of the power cylinder 30 thus raising the piston therein to open the valve D to permit material from the chamber A to flow into the bag mounted on the spout B.

A branch conduit 232 connects the conduit 230 with the bag clamp actuating cylinder 40 through a restricted orifice 234. A by-pass conduit 236 is connected around the restricted orifice 234 and is provided with a check valve 238 whereby air under pressure from the conduit 230 may pass through the by-pass conduit 236 and the check valve 238 to insure quick action of the clamp mechanism to its clamping position. However, upon release of the pressure in the conduit 230, the venting of the power cylinder 40 must be accomplished through the restricted orifice 234 since the check valve 238 prevents the return flow through the by-pass conduit 236. Thus the bag clamp will be actuated quickly to its clamping position but will be delayed when moving in the opposite direction to release the bag.

A branch conduit 240 connects the conduit 232 with the control valve 176 for the inflatable gland 15 surrounding the nozzle B and adapted to fill the valve opening of the bag mounted thereon. The conduit 240 is provided with a restricted orifice 242 which delays the actuation of the control valve 176 until after the bag clamp has been actuated. The return flow of air through the conduit 240 by-passes the restricted orifice by means of a by-pass conduit 244 provided with a check valve 246.

The control valve 176 is of the spool type comprising a spool 250 adapted to be moved upwardly within the valve housing by pressure from the conduit 240. When in its uppermost position, as illusrtated in FIG. 5, air from the conduit 174 can pass freely through the valve to the conduit 178 to inflate the gland 15. When the spool 250 is moved to its lower position, the upper end of the spool blocks the end of the conduit 174 and the conduit 178 is placed in communication with a discharge port 252 in the housing of the valve 176 to vent the air from the gland 15, thus releasing the bag for discharge from the spout B.

A branch conduit 260 connects the conduit 230 with one end of the power cylinder 66 and conducts air pressure from the conduit 230 to said power cylinder 66 to move the piston therein in a direction to open the plate valve 64 to permit the low pressure air from the blower to enter from the conduit 68 into the manifolds 58, 50 and 52 to pressurize the chamber A during the filling operation. Simultaneously, the air in the conduit 260 is communicated through the conduit 128, which is connected thereto, to the valve 124 to close the same and cut off the flow of low pressure air from the conduit 68 through the conduit 122 to the fluidizing pads in the upper fluidizing chamber F.

A branch conduit 262 connects conduit 260 with the lower end of the power cylinder 100 to actuate the valve mechanism E to cut off the flow of material from the fluidizing chamber F to the pressure chamber A, and to close the vent conduit 74 of the pressure chamber A.

When either the manual stop valve 200 or the scale actuated stop valve 202 is actuated, the elements of the main control valve 184 are moved to the left as viewed in the FIG. 5, thus connecting the conduit 230 to the discharge port 212 in the housing of the valve 184 through the hemispherical recess 220 on the slide member 206, and at the same time exposing the port 216, which was previously connected to the port 214, to the pressure existing within the valve chamber 188.

The port 216 is connected by a conduit 270 to the upper end of the power cylinder 30 to move the piston therein downwardly to close the valve mechanism D and prevent further flow from the chamber A to the bag mounted on the spout B.

A branch conduit 272 connects the conduit 270 with the upper end of the control valve 176 through a restricted orifice 274, thus moving the spool 250 downwardly in the control valve 176 to cut off flow from the conduit 174, and to vent the conduit 178 through the port 252. Return flow through the conduit 272 by-passes the restricted orifice 274 by means of a by-pass conduit 276 which is provided with a check valve assembly 278 for preventing flow to the right through the branch conduit 276 as viewed in FIG. 5.

A branch conduit 280 connects the conduit 270 with the opposite end of the power cylinder 66 for moving the plate valve 64 to a position preventing further flow from the conduit 68 into the manifolds 50, 52 and 58.

Since pressure is no longer being applied through the conduits 260 and 128 to the valve 124, and since these conduits are being vented through the conduit 230 and the port 212 in the main control valve 184, the spring 126 opens the valve 124 to permit flow from the conduit 68 into the plenum chamber 120 and through the porous floor 118 of the fluidizing chamber F.

A branch conduit 282 connects the conduit 280 with the upper end of the power cylinder 100. Pressure from the conduit 270 is thus applied to the upper end of the piston within the power cylinder 100 to move the same downwardly to open the valve E to permit material to flow from the fluidizing chamber F into the pressure chamber A to fill the same, and at the same time opens the vent 74 to permit the fluidizing air entering through the porous wall 20 at the bottom of the pressure chamber A to vent through the storage hoppers H.

In the operation of the apparatus disclosed herein, a bag to be filled is placed over the filling spout B by the operator who then presses the start valve 198. The actuation of the bleeder valve 198 shifts the main control valve to the position illustrated in FIG. 5. The high pressure air from the conduit 182 enters the conduit 230 and moves the main fill valve D to its open position. Simultaneously, the high pressure air from the conduit 230 travels through the conduit 260 and actuates the plate valve 64 to permit the low pressure air to enter the manifolds 58, 50 and 52 to pressurize the chamber A. At the same time, the valve 124 is closed to cut off the flow of air to the fluidizing chamber F. The high pressure air from the conduit 260 is conducted through conduit 262 to the power cylinder 100 which actuates the cut-off valve E to cut off the flow of material from the fluidizing chamber F to the chamber A and simultaneously close off the vent conduit 74. Air from the conduit 230 travels through the conduit 232 and through the by-pass conduit 236 around the restricted orifice 234 to actuate the cylinder 40 to tilt the nozzle B upwardly against the stationary clamp 32 to clamp the bag thereon. Air from the conduit 232 travels through the restricted orifice 242 and the conduit 240 and actuates the control valve 176 to permit air from the conduit 174 to enter the conduit 178 to inflate the gland 15 to form a seal between the nozzle B and the valve opening 9a in the bag. It will be appreciated that, since the air which actuates the valve 176 must pass through the restricted orifice 242, there will be an appreciable time delay before the actuation of the control valve 176, and therefore a corresponding delay after the initial start of the filling through the nozzle B before the gland 15 is inflated to fill the valve on the bag.

When the weight of the material deposited in the bag, as detected by the scale mechanism 11 (FIG. 1) upon which the bag rests, reaches a predetermined point, the scale mechanism actuates the bleeder valve 202. If the operator should desire to stop the flow from the nozzle B for any reason prior to the actuation of the valve 202 by the scale mechanism, he need only press the button controlling the valve 200. When either the manually operated valve 200 or the scale actuated valve 202 is actuated, the elements of the main control valve 184 will be shifted to the left as viewed in FIG. 5. When the control elements in the control valve 184 shift to the left, the pressure in the conduit 230 will be vented through hemispherical recess 220 in the slide 206 and through the discharge port 212. Pressure within the chamber 188 will be applied to the conduit 270 and thus to the power cylinder 30 to close the main flow valve D. The same pressure will be applied through the conduit 280 to the power cylinder 66 to close the plate valve 64. Also, the pressure will be applied through the conduit 282 to the upper end of the power cylinder 100 to open the flow valve E to permit material to flow from the fluidizing chamber F into the pressure chamber A to replenish the same. Since the pressure in the line 230 is being vented, the spring 126 will move the valve 124 to its open position to permit the low pressure air from the conduit 68 to enter the fluidizing chamber F to fluidize the material therein, and the material in the conduit G leading from the hoppers H. Pressure from the conduit 270 will flow through the restricted orifice 274 in the conduit 272 and move the control valve 176 so that the spool 250 blocks the conduit 174 and permits the pressure in the conduit 178 to vent through the port 252, thus causing the gland 15 to deflate to release the valve opening of the bag. The pressure in the line 232 leading to the power cylinder 40 of the clamp mechanism will slowly vent through the restricted orifice 234 and the weight of the bag will move the spout B downwardly and the bag will fall therefrom.

The pressure chamber A need not be very tall and the machine can operate with a low head of material since the pressurizing of the pressure chamber A during the bag filling cycle increases the rate of flow through the spout B into the bag and thus cuts down on the time necessary to deposit a given amount of material within the bag. Since the material in the pressure chamber A is replenished between fill cycles, and each fill cycle starts with the chamber A filled to the top, the effective head operating on the material during each fill cycle is always the same, therefore increasing the accuracy with which the amount of material deposited in each bag may be controlled.

While a preferred embodiment of the invention has been described herein it should be understood that various changes may be made in its construction without departing from the spirit of the invention as defined in the appended claims.

The invention having thus been described, what is claimed and desired to be protected by Letters Patent is:

1. Apparatus for filling powdered or granular material into containers comprising a substantially air-tight pressurizing chamber having a discharge spout at the lowermost portion thereof, means for supplying fluidizing air to said chamber at said lowermost portion thereof, a high volume-low pressure air source, a first air conduit connecting said air source with said air chamber at a position spaced above said lowermost portion, a material supply chamber positioned above said pressurizing chamber, conduit means connecting said chambers for permitting said material to gravitate from the material supply chamber to the pressurizing chamber and including a valve therein for sealing off said pressurizing chamber, a second air conduit connected to said air source and to the lowermost portion of said material supply chamber for supplying fluidizing air thereto, valve means operatively associated with said first and second air conduits and being arranged for movement to a first position to cause said first air conduit to be blocked while said second air conduit is open to flow therethrough and to a second position to cause said second air conduit to be blocked while said first air conduit is open to flow therethrough, and control means for moving said valve means to said first position when the valve in said conduit means connecting the chambers is open to permit said material to enter the pressurizing chamber and for moving said valve means to said second position when the valve in the conduit means connecting the chambers is closed and said discharge spout is open to permit the pressurized discharge of material from said pressurizing chamber.

2. Apparatus for filling powdered or granular material into containers comprising a substantially air-tight pressurizing chamber having a discharge spout at the lowermost portion thereof, means for supplying fluidizing gas to said chamber at said lowermost portion, separate means for supplying high volume-low pressure gas to said chamber at a position spaced above said lowermost portion, a material supply chamber positioned above said pressurizing chamber, conduit means connecting said chambers for permitting said material to gravitate from said material supply chamber to said pressurizing chamber and including a valve therein for sealing off said pressurizing chamber, and means for supplying fluidizing gas to the lowermost portion of said material supply chamber to obtain rapid filling of said pressurizing chamber, said means for supplying high volume-low pressure gas to said pressurizing chamber and said means for supplying fluidizing gas to the lowermost portion of said material supply chamber being operated alternately so that gas is supplied to the pressurizing chamber only when said valve in the conduit means is closed and gas is supplied to the material supply chamber only when said valve is open.

References Cited by the Examiner
UNITED STATES PATENTS

| | | | |
|---|---|---|---|
| 2,032,367 | 3/1936 | Kennedy et al. | 302—53 |
| 2,795,389 | 6/1957 | Aust | 141—315 X |
| 2,887,292 | 5/1959 | Titchenal | 222—195 X |
| 2,905,362 | 9/1959 | Aust | 222—195 X |
| 2,922,611 | 1/1960 | Aust | 141—83 X |
| 3,073,401 | 1/1963 | Zenke | 177—63 |

LAVERNE D. GEIGER, *Primary Examiner.*

LOUIS J. DEMBO, *Examiner.*

J. JACKSON, H. BELL, *Assistant Examiners.*